United States Patent [19]
Perkinson

[11] 3,715,717
[45] Feb. 6, 1973

[54] MEANS FOR HANDLING ALTITUDE INFORMATION IN COLLISION AVOIDANCE SYSTEMS

[75] Inventor: Robert E. Perkinson, St. Louis County, Mo.

[73] Assignee: McDonnell Douglas Corporation, St. Louis, Mo.

[22] Filed: Feb. 12, 1970

[21] Appl. No.: 10,907

[52] U.S. Cl. ................................. 340/27 R, 340/23
[51] Int. Cl. .......................................... G08g 5/04
[58] Field of Search ..... 340/23, 27; 343/7.5, 112 CA; 325/19; 179/15 BZ

[56] References Cited

UNITED STATES PATENTS

| | | | |
|---|---|---|---|
| 3,097,354 | 7/1963 | Blownsky | 343/6.5 |
| 3,412,399 | 11/1968 | Chisholm | 343/6.5 |
| 3,217,321 | 11/1965 | Cox, Jr. | 343/112.4 |
| 3,262,111 | 7/1966 | Graham | 340/23 |
| 3,310,806 | 3/1967 | Stansbury | 343/112.4 |
| 2,649,540 | 8/1953 | Homrighous | 179/15 BZ |
| 2,933,726 | 4/1960 | Campbell et al. | 235/150.23 |
| 3,341,812 | 9/1967 | Perkinson et al. | 340/23 |

*Primary Examiner*—Kathleen H. Claffy
*Assistant Examiner*—Thomas L. Kundert
*Attorney*—Charles B. Haverstock

[57] ABSTRACT

An apparatus for improving the handling of altitude information in collision avoidance systems and the like including means to minimize the possibility that a command maneuver to climb or dive to avoid being on a collision course will cause the involved aircraft to fly through each others altitude, said apparatus also including means to improve the reporting of altitude information in collision avoidance systems so that actual as well as shifted altitude information will be transmitted when a maneuver is commanded to forewarn other aircraft of possible dangerous situations developing as a result of the maneuver.

11 Claims, 1 Drawing Figure

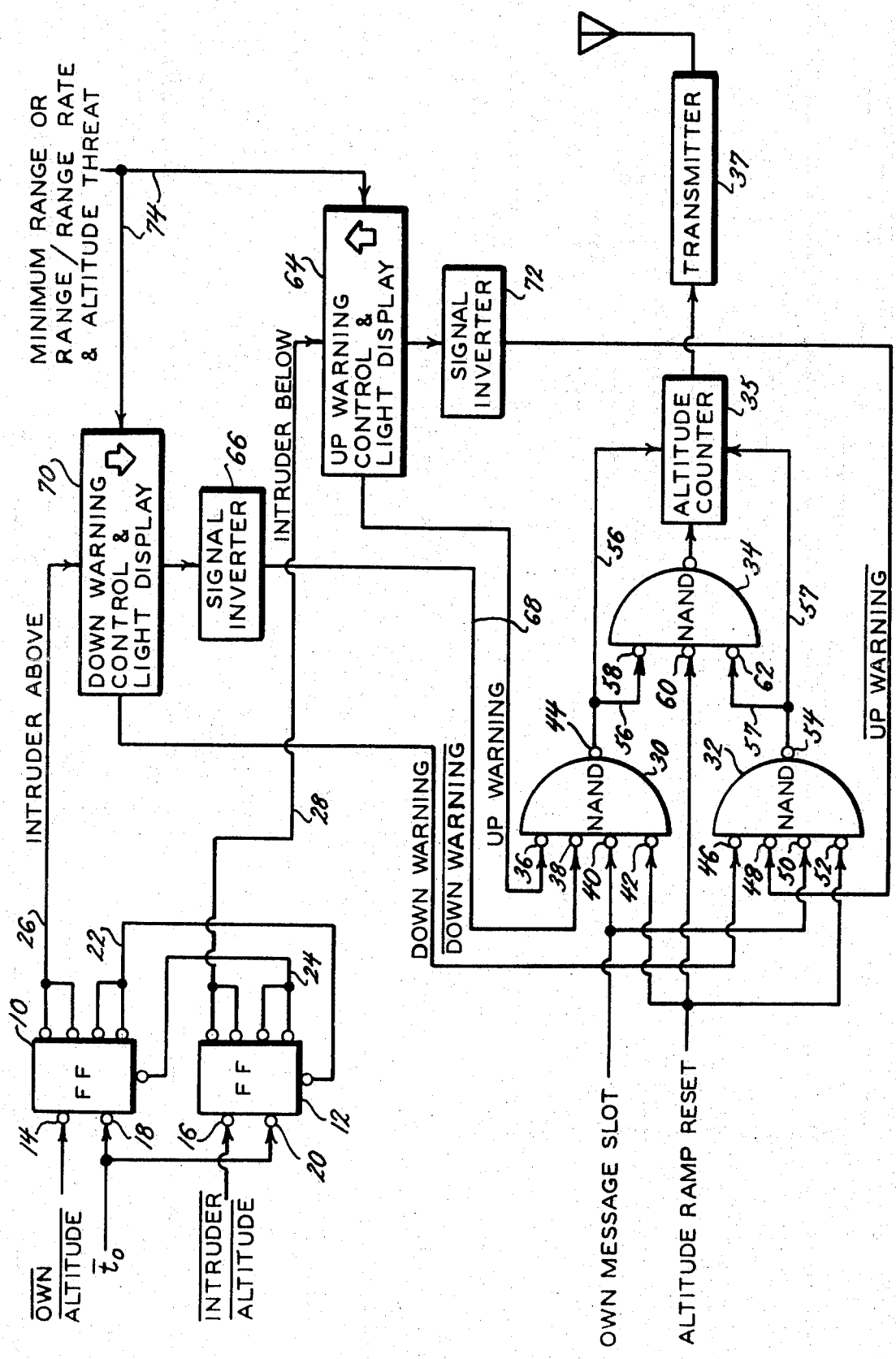

MEANS FOR HANDLING ALTITUDE INFORMATION IN COLLISION AVOIDANCE SYSTEMS

The present invention relates generally to improvements in collision avoidance systems and the like and more particularly to improvements in systems such as the system disclosed in Perkinson et al. U.S. Pat. No. 3,341,812, which issued Sept. 12, 1967, and is assigned to Applicant's assignee.

It is a principal object of the present invention to provide improved and more reliable means for reporting and handling altitude information in collision avoidance systems.

Another object is to minimize the possibility of commanding aircraft that represent threats to each other to change altitudes in directions such that any two of the threatening aircraft will pass through the same altitude as any of the other threatened aircraft.

Another object is to provide means for transmitting altitude information which takes into account and projects information as to maneuvers which are commanded or in process and which affect the altitude of the transmitting aircraft.

Another object is to provide means for transmitting shifted altitude information from which aircraft flying at other altitudes can determine whether they will be on a collision course with the transmitting aircraft.

Another main object is to provide means to make flying safer.

Another object is to make sure that all aircraft flying at or near the same altitude and representing possible collision threats to one another are given appropriate escape maneuver commands which will prevent the possibility of collision.

Another object is to provide relatively inexpensive means for use in conjunction with known collision avoidance systems to increase the protection provided by the system.

Another object is to incorporate in collision avoidance systems for use on aircraft improved means for protecting the aircraft during times when one or more aircraft is changing altitude.

Another object is to minimize the amount of maneuvering necessary for aircraft to escape from potentially dangerous situations.

Another object is to reduce or eliminate the possibility that two or more aircraft flying at or near the same altitude will be given the same or similar instructions to avoid a collision.

Another object is to prevent the giving of ambiguous warnings and instructions in aircraft equipped with collision avoidance equipment particularly with regard to altitude information and regardless of the number of aircraft involved.

These and other objects and advantages of the present invention will become apparent after considering the following detailed specification which covers a preferred embodiment thereof in conjunction with the accompanying drawing, wherein:

The FIGURE is a circuit diagram in block form of a warning control circuit for a collision avoidance system constructed according to the present invention.

One of the main problems in most known collision avoidance systems is the problem of transmitting altitude information between cooperating aircraft in a manner to enable the various aircraft to determine not only when two or more aircraft present threats to one another but also to produce appropriate command maneuvers to avoid collision and at the same time to protect against the possibility that a climbing or diving aircraft will present a threat to an aircraft at another altitude. An altitude threat exists when two or more aircraft are, or soon will be, flying at or near the same altitude on courses that are bringing them closer together. The means and method for determining when two or more aircraft are on a collision course is discussed in detail in Applicant's U.S. Pat. No. 3,341,812. When it is determined that aircraft are a threat to one another, the involved aircraft should be given appropriate timely instructions or maneuver commands so that they can avoid or escape from the threatening conditions. Various ways have been proposed and various means devised to accomplish this including giving complementary up and down or right and left turn maneuver instructions. One way of implementing this is applicable particularly to a synchronized collision avoidance system wherein each cooperating aircraft includes time synchronized means as disclosed in Perkinson et al. U. S. Pat. No. 3,341,812. In such a system each cooperating aircraft is assigned a distinct message slot which occurs at the same exact time in each repeating time interval and during each occurrence of its message slot it transmits information that identifies it and indicates its altitude. The same information can also be used to determine range and range rate, all of which information is evaluated in each aircraft to determine if a threatening condition exists. In the known systems when a collision course is indicated an arbitrary assignment of complementary command maneuvers is made usually based on some criteria such as on which of the aircraft has the lowest (first to occur) and which the highest (latest to occur) assigned message slot. For example, an aircraft assigned a lower numbered message slot may arbitrarily be directed to dive while an aircraft having a higher numbered message slot may at the same time be directed to climb. Since each aircraft is assigned a distinct message slot such an arbitrary arrangement will assure that when two aircraft are threats to each other they will be given complementary instructions. However, an arbitrary arrangement such as described has certain disadvantages and limitations which make it inadequate and unacceptable in certain situations. In particular, such a system when applied to a collision avoidance system that requires establishing arbitrary limits as to what will be and what will not be considered a coaltitude condition has certain disadvantages. For example, for the limits of a coaltitude condition to be reasonable they should cover an altitude band that may be as wide as six or seven hundred feet or more in a typical situation. Under these conditions and using the time of occurrence of assigned message slots as the test, an aircraft flying six or seven hundred feet lower than another coaltitude aircraft but having a higher message slot would be instructed to climb while the higher flying aircraft would be instructed to dive. This is obviously undesirable and is one situation that the present means are designed to overcome. The arbitrary complementary command system also has disadvantages and limitations in situations where more than two aircraft represent coaltitude threats to each other. With the possible exception of situations where one aircraft is descending or climbing more or less directly above or below another aircraft, the principal disadvantage that can occur from a system that gives complementary commands based on some arbitrary criteria when only two aircraft are involved is excessive maneuvering. However, if a system that gives arbitrary complementary commands is applied to a situation where two aircraft are flying directly above and below one another within a warning band representing a coaltitude condition for purposes of establishing a collision warning, a dangerous situation may exist even with respect to the two aircraft.

The use of altitude difference instead of time of occurance of message slots as the basis for the generation of maneuvering commands in collision avoidance equipment has for some time been attractive from the standpoint of reducing excessive maneuvering and preventing "sneak" approaches from above or below. However, the known altitude difference logic up until the present device has in it the serious disadvantages outlined above including particularly the possibility of producing identical escape maneuver commands in two aircraft flying at approximately the same altitude. The present means overcome this and other disadvantages and shortcomings of existing equipment, and make existing collision avoidance equipment even safer to use. The present means also have the capability of transmitting altitude information which is projected to reflect a changing altitude situation under warning or maneuver command conditions as well as during a maneuver involving a change in altitude.

The present means includes means for producing maneuver commands based on altitude difference, and the commands produced not only assure that both aircraft will receive complementary instructions but also that the higher aircraft will be commanded to climb and the lower to dive thereby minimizing the amount of maneuvering and providing an added safety factor so that there will be practically no possibility that the aircraft will pass through each others altitude when making their escape maneuvers. Another unique feature of the present means is in the provision of means for transmitting shifted altitude information which reflects a maneuver decision or command once such a command is given but before the command is executed. This is accomplished by transmitting shifted altitude information to warn other aircraft which may not at that instant be a threat but which will become a threat as a result of making the commanded maneuver which involves a change in altitude. By shifting the altitude transmissions to reflect the position of the commanded aircraft at some future time, other aircraft which may be threatened as a result will have an opportunity to be forewarned even before the aircraft making the altitude change reaches its new altitude. In situations where two or more aircraft are potential threats to each other because they are flying in the same altitude band but near the extremes thereof, a shifted altitude signal generated by one or more of the aircraft may also actually make the generation of a maneuver command unnecessary thereby reducing the number of required evasive maneuvers. Under the same circumstances, the aircraft that transmits the shifted altitude information will continue to determine the need for its maneuver command based on its actual altitude separation from other aircraft, and only when a safe altitude separation has been achieved, will the means for producing the maneuver commands be turned off so that the transmissions of unshifted altitude information can be resumed.

In situations where three aircraft are potential coaltitude threats to each other, the aircraft flying at the center or inbetween altitude relative to the others will receive both up and down warnings on its control panel, and under these conditions no evasive maneuver will be called for by it, and hence no shifted altitude transmissions will take place. Where more than three aircraft are involved in a potential altitude conflict, the same general principles apply, and can be handled by the present means as will be described hereinafter.

The FIGURE shows a circuit which includes two similar flip-flop circuits 10 and 12, each of which has input and output connections. The flip-flop circuits must at all times be in one of two operating conditions, that is to say when one of the circuits is in one of its two operating conditions the other circuit must be in its opposite condition. By the same token when a signal is received which causes a change in the condition of one of the flip-flop circuits, the other flip-flop will simultaneously change but in an opposite sense. It should also be understood that a similar circuit is included in each cooperating aircraft, and in the discussion which follows the word "own" will be used to refer to one aircraft and the words "intruder" or "intruders" to other aircraft.

The flip-flop 10 in each aircraft has a first input 14 which is connected to receive input signals which represent the electrical inverse or mirror image of its own altitude which is the altitude of the aircraft in which the system is located. The inverse form of the signal is represented by the line drawn over the expression "Own Altitude", and means that an input will be present at the input 14 at all times except when the input is identical with the aircraft's own altitude. "Own Altitude" is represented by a pulse which occurs after the beginning of a received message by a time interval that is proportional to the altitude of the own aircraft, and the time of occurrence of the altitude pulse is determined by means carried in the aircraft. Such means may include pressure sensitive means, ground bounce means, or other like means all of which are well known devices for determining and indicating altitude.

The circuit in the FIGURE receives input altitude signals which are the result of measurements made by the altitude measuring means in its own aircraft as well as altitude signals similarly produced and transmitted from other aircraft in their assigned message slots. The present system operates as part of a time synchronized system in which each cooperating aircraft is assigned a distinct message slot which reoccurs at the same exact time in each repeating period. For example, a time period may last for several seconds and be divided into message slots of a few millisecond durations. For example, if each message slot is of two milliseconds duration there will be 500 message slots in each second of each time period. Within its assigned message slot each aircraft transmits, among other things, an altitude pulse which commences at some predetermined time after the end of a range pulse which may be of 200 microseconds duration and commences at the beginning of the message slot. The time duration between the end of the 200 microsecond range pulse and the beginning of the altitude pulse will then be proportional to the altitude of the aircraft. All cooperating aircraft will do exactly the same thing except that each aircraft will transmit this information only in its assigned message slot but will use this same information in the aircraft to make altitude comparisons in every message slot in which it receives a transmission from another aircraft. Each aircraft will therefore transmit information as to its own altitude only in its assigned message slot, and will receive similar transmissions from other aircraft in their assigned message slots. A direct comparison of the altitudes of the transmitting and receiving aircraft can then be made using the subject circuits including particularly the flip-flops 10 and 12 as stated. However, before any meaningful outputs will be produced by the present means it is first necessary for all of the criteria to be satisfied as to the existence of a warning condition. As already mentioned some of the inputs to the flip-flops 10 and 12 are inverted inputs or electrical mirror images of the actual input signals, but this does not change the basic operating characteristics and is done more for convenience than for any other reason.

The flip-flop 12 has another input 16 which is connected to receive input signals representing the inverse of the altitude of an intruding and potentially threatening aircraft. The flip-flops 10 and 12 also have other input connections 18 and 20 respectively, which are connected together and to a source of timed input signals identified in the drawing as timing pulses $t_o$. These pulses are used to reset the flip-flops 10 and 12 to some predetermined reset condition at the beginning of, or immediately prior to the start, of each message slot. When a $t_o$ impulse resets the flip-flops 10 and 12 at the beginning of each message slot, a ramp generator or like means are started which continue counting until stopped by receipt of a pulse at the terminal 14 or 16 which ever happens to arrive first. As already stated, the altitude of each aircraft is represented by the time interval between the start of its assigned message slot (or the end of its range pulse) and the time of occurrence of the leading edge of the altitude pulse which occurs in its message slot. There can be any desired number of message slots in the repeating time periods depending upon the capacity of the collision avoidance system, and the flip-flops 10 and 12 will therefore be reset many times during each operating cycle or time period. For example, there may be several thousand or more message slots in each time period, and each cooperating aircraft will be assigned a distinct one of the message slots which will occur at exactly the same time in each of the time periods.

The first altitude pulse to arrive at the flip-flop 10 or 12 in a particular message slot will trigger the associated flip-flop and in so doing will provide a logic output signal to indicate whether the intruding aircraft is flying at a higher or lower altitude than the own aircraft. For example, if each cooperating aircraft is assigned a message slot of say two milliseconds duration, the altitude pulse which occurs nearest to the beginning of the range pulse will represent the aircraft that is flying lower. This requires that during every message slot in which a message is received, the own aircraft produces its own altitude pulse, timed with respect to the beginning of the received range pulse, for comparison with the received altitude pulse of the cooperating aircraft. This means that if both flip-flops 10 and 12 are reset at the same time beginning of each message slot, then the first altitude pulse received or generated, be it the own aircraft's altitude pulse or the altitude pulse received from another or intruder aircraft, will indicate which of the two aircraft is flying at the lower altitude. It is also possible to make the altitude pulse which occurs nearest the beginning of the range pulse represent the higher flying craft without departing from the invention. Furthermore, because of the cross-coupling connections 22 and 24 between the flips-flops 10 and 12 the first flip-flop to be triggered will operate to lock the other untriggered flip-flop in its untriggered state. The above/below information contained by the two flip-flop circuits 10 and 12 can then be used in the warning logic for determining what, if any, excape maneuver is called for and/or commanded. For example, if the flip-flop 10 receives its own altitude signal before the flip-flop 12 receives the intruder's altitude signal, the flip-flop 10 will be triggered, and will produce an output at its output terminal 26 indicating that the intruder is flying at a higher altitude than the "own" aircraft. By the same token, if the intruder aircraft altitude signal occurs first thereby triggering the flip-flop 12 and locking the flip-flop 10 in its untriggered condition, an output signal will be produced on the output terminal 28 of the flip-flop 12 indicating that the intruder if flying at a lower altitude than the "own" aircraft. It is important to recognize that before the present circuit can operate and produce meaningful outputs it must first be determined that the aircraft involved are threats to each other and this means, among other things, that they are flying at approximately the same altitude within some preestablished altitude band which is an arbitrary coaltitude band for collision avoidance purposes. The means for making this determination are described in Perkinson et al. U.S. Pat. No. 3,341,812. It is also important to recognize that regardless of how close to the exact same altitude the aircraft are flying one will always be indicated by the present means as being the higher and the other the lower. This is so because it is only possible for one of the flip-flops 10 and 12 to be triggered first in any assigned message slot. The outputs of the flip-flop circuits are used to energize appropriate indicator means, providing there is a threat as determined by Range/Range Rate and Altitude sorting signal 74, said indicator means shown as the up warning and down warning control and light displays 64 and 70, respectively, the display portions of which are conveniently located in the cockpit. The warning control and displays 64 and 70 are usually energized for some predetermined time period such as for a period equal to the time period required for each repeating cycle of operation of all of the message slots.

The subject circuit also includes a gate maze circuit which is shown in the FIGURE constructed of three NAND gates 30, 32 and 34. The NAND gates are connected to respond to the warning control and light displays 64 and 70, and the NAND gates produce other outputs which can be used for presetting an altitude counter or ramp generator 35 which may be part of the collision avoidance system of which the present device is a part and used for normal or shifted altitude reporting and/or transmitting using the transmitting means and associated antenna means 37 which are shown generally.

The NAND gate 30 has four separate input connections 36, 38, 40 and 42 and an output connection 44. The input connection 36 is connected to receive "up" warning inputs from the output of the Up Warning Control And Display 64, the input connection 38 to receive inverted or "not down" warning signals from the output of the Signal Inverter 66, the input connection 40 receives the aircraft's own message slot information, and the input connection 42 receives reset inputs. It is the nature of NAND gates that they produce output signals under all conditions except when there are inputs simultaneously present at all of their input connections. This means there will be outputs from the NAND gates 30 at all times when there are input signals at less than all of the inputs as well as when there are no signals at any of the inputs. By the same token there will be no signal at the output connection 44 of the NAND gate 30 when there are inputs simultaneously present at all four of the input connections 36–42. The electrical characteristics and features of the present means involve matters of good engineering practice, and the particular embodiment shown using NAND gates is a convenient one but this selection is not at the heart of the invention.

The NAND gate 32 is similar to the NAND gate 30 in that it has four input connections 46, 48, 50 and 52 and one output connection 54. In the case of the NAND gate 32, however, the input connection 46 receives down warning output signals from the down warning control and light display 70 instead of from the up warning control and light display 64 and inverse or "not up" warnings from the output of the Signal Inverter 72.

The NAND gate 30 produces output 56 which operates to reset the altitude generator or counter 35 at the own aircraft during a climb warning period when the climb arrow in the up warning and light control display 64 is energized. These signals can also be used to delay the start of the altitude ramp generator for transmission of higher than actual altitude output signals which will enable other aircraft in the area flying at higher altitudes to determine in advance and in the usual way the future existence of a possible dangerous condition which will occur as the own aircraft executes its climb maneuver. In similar manner, the NAND gate 32 senses the condition of a down maneuver being flashed to the pilot and generates outputs on another lead 57. These outputs can be used to advance the starting time of the altitude ramp generator for transmission of lower than actual altitude condition signals which takes into account the indicated and commanded dive maneuver. These operations are important for the present device to enable it to advise other aircraft as to what its altitude will be at some future time as a result of a climbing or diving maneuver that is or is about to be made and to prevent other aircraft from making the same decision.

The NAND gate 34 has three input terminals 58, 60 and 62 with the terminal 58 connected to receive the outputs of the NAND gate 30, the terminal 62 connected to receive the outputs of the NAND gate 32, and the terminal 60 connected to receive the same reset impulses which are also fed to the terminals 42 and 52, respectively, of the NAND gates 30 and 32. The NAND gate 34 produces outputs during altitude counter resets anytime that neither of the NAND gates 30 and 32 is generating an output. The NAND gates 30 and 32 cannot simultaneously generate outputs because of the automatic lockout feature provided by the Up and "Not Down" inputs to the gate 30 on input connections 36 and 38, respectively, and the Down and "Not Up" inputs to the gate 32 on the input connections 46 and 48. This means that in an aircraft's own message slot, the NAND gate 34 will produce an output pulse for normal counter resetting if no warning is being flashed to the pilot, or if both up and down warnings are simultaneously being energized and displayed but not under conditions when there is only an up or down command. In all message slots other than "own message slot" the NAND gate 34 will produce an output for normal resetting of the altitude counter regardless of whether the own pilot is receiving a command. Furthermore, once the criteria required for generating a command maneuver no longer exist, the present circuit will reset to a standby condition in its own slot and the NAND gate 34 will produce normal reset output pulses.

The outputs of the three NAND gates 30, 32 and 34 can be used in any desired combination for predeterminately resetting of a digital altitude counter or for adding to or subtracting from an arbitrary voltage such as is used in a ramp generator, in either case to shift the altitude signal in a desired direction. Resetting of the altitude generator can take several different forms depending on the form of generator used. For example, if a digital altitude counter is used it can be reset to some predetermined initial number of counts and in the case of an analog altitude generator by a shift in the initial voltage level.

In the FIGURE, an intruder above output on the lead 26, as already stated, is also used to energize down warning and light display 70 in the own cockpit to alert the pilot to the fact that there is an intruding aircraft flying at a higher altitude and representing a present danger. This is the same signal that is fed to the down warning input connection 46 of the NAND gate 32 and to inverter circuit 66 by way of the down warning control and display 70 which has its output connected by lead 68 to the inverted down or "not down" warning input connection 38 of the NAND gate 30. In a similar manner, the output connection 28 of the flip-flop 12 is connected to energize the up warning control and light display 64 in the cockpit when there is a threat and also to provide signals for the up warning input connection 36 of the NAND gate 30. The output of the up warning control and light display 64 is also connected to another inverter circuit 72 which has its output connected to the inverted up or "not up" warning input connection 48 of the NAND gate 32. Thus it can be seen that the conditions of the flip-flops 10 and 12, together with a threat situation or signal 74, not only control the energizing of the cockpit warnings for the pilot but also control the inputs to the AND gates 30 and 32. The conditions of the NAND gates 30 and 32 in turn control the type of resets that will occur, and whether the "own" message slot reset will receive normal or shifted reset signals during a warning condition.

It can therefore be seen that the present improvements are designed and constructed to provide and assure a safe vertical separation between aircraft and particularly between aircraft that are determined to be threats to each other. This is true even in cases where only one of two or more warned aircraft can or does obey a command to climb or dive. It is anticipated that in the vast majority of cases involving two fully equipped aircraft that both aircraft will cooperate by making maneuvers as instructed by the commands they receive. However, exceptional situations may occur and the present system has built in safety features that assure a safe vertical separation in situations even where only one of the warned aircraft makes its commanded maneuver. These provisions also help to make the system compatible and safe to use as between fully and partially equipped aircraft. For example, a commercial aircraft may be fully equipped with a collision avoidance system such as the system disclosed in U.S. Pat. No. 3,341,812 while a smaller aircraft for expense reasons or otherwise may have somewhat less than a complete system and still be able to cooperate with more fully equipped aircraft with a high degree of safety even though on a somewhat limited basis.

There are therefore several different features of the present system which make it a particular valuable addition to a collision avoidance system such as the system disclosed in U.S. Pat. No. 3,341,812. One of these features is the ability of the present system to make a very accurate determination as to which of two or more aircraft, even though flying at or near the same altitude or within the limits of what is considered to be a coaltitude condition, is higher or highest and which is lower or lowest. This is determined by which of the flip-flops 10 or 12 is triggered. By knowing this it is possible to give maneuver commands which substantially reduce the possibility that any warned aircraft will fly through the others altitude to avoid collision. This not only enchances the safety but also reduces to a minimum the amount of necessary maneuvering. The features of the present system which enable transmission of altitude signals which are shifted to give effect to a commanded maneuver to provide a basis by which to determine if future collision conditions may occur as a result of the maneuver, is also important to the system. Shifted altitude signals can also be transmitted any time an aircraft is climbing or diving, but unless the aircraft is commanded to do so as a result of the existence of a warning condition from its collision avoidance system it is outside of the normal scope of this invention and is part of the collision avoidance system itself.

In a typical situation where the present means are to be used, a vertical separation between cooperating aircraft of more than 800 feet is considered a safe separation and anything less is considered to be a coaltitude condition for purposes of determining whether or not a warning should be given. In this case, the 800 feet separation is somewhat greater than the usual separation considered to be a safe minimum separation. The 800 feet separation results from the incremental digitizing of the altitude plus a likely overshoot due to the pilot's inability to reduce the altitude rate of change to zero promptly after a vertical avoidance maneuver command is terminated. The somewhat greater minimum safe separation required by the present system therefore, provides a measure of added protection, and in addition compensates for pilot overshoot.

There has thus been disclosed novel improvements to collision avoidance systems and particularly synchronized systems which make the known systems safer and more reliable to use particularly in the evaluating and transmitting of altitude information. It is apparent, however, that the particular embodiment chosen to illustrate the invention is not all inclusive and many changes and variations could be made without departing from the spirit and scope thereof. For example, many different forms of flip-flops and gate circuits could be used to mention several obvious possibilities. All such changes and variations which do not depart from the spirit and scope of the invention are deemed covered by the present invention which is limited only by the claims which follow.

What is claimed is:

1. In a cooperative collision avoidance system which operates on real time and on one-way transmissions between cooperating aircraft and wherein each cooperating aircraft includes time keeping means, and means for time synchronizing the time keeping means thereat with similar time keeping means in other cooperating aircraft, and wherein each cooperating aircraft is assigned a distinct message slot which reoccurs at the same time in each repeating time interval in which to transmit information signals, means in each aircraft for receiving said information signals transmitted by other cooperating aircraft in range thereof from which information signals each receiving aircraft can determine by receipt thereof whether threat of collision exists between it and the transmitting aircraft, said transmitted information signals including information time coded to represent the altitude of the transmitting aircraft, said means in each aircraft for making a determination as to whether conditions exists which represent a potential collision threat with another cooperating aircraft including means for making the determination based only on a determination of range, range rate and whether the involved aircraft are within a predetermined established coaltitude band with respect to each other, the improvement comprising means at said one aircraft for generating an impulse which represents its present altitude in each assignable message slot and means for determining by the time of receipt of the first of two altitude impulses to occur including its own altitude impulse and an impulse from another aircraft that has been determined to be a threat thereto in the message slot assigned to said other aircraft which of the aircraft is higher and which is lower, said means including bi-stable means in each aircraft operable to ascertain by the first of said two impulses to occur in the message slot assigned to said other aircraft which of the threatened aircraft is flying at a higher and which is flying at a lower altitude in the established coaltitude band, means for shifting the altitude transmission from each such aircraft in a direction to reflect an altitude that is in the direction in which the said aircraft is commanded to maneuver so that reciprocal escape maneuver commands will be produced in the involved threatened aircraft during subsequent transmissions in the message slots assigned to the aircraft from which the shifted altitude signals are transmitted, an up warning indicator and a down warning indicator located in the cockpit of said one aircraft, means for energizing said up warning indicator whenever it is determined that the said one aircraft is flying at a higher altitude than the other aircraft after it is also determined that said other aircraft represents a threat, said down warning indicator being energized whenever it is determined that the said one aircraft is flying at a lower altitude than the other aircraft involved after it is determined that there is a threatening condition.

2. In the cooperative collision avoidance system of claim 1 the further improvement of means responsive to the energizing of the up warning indicator to shift the time of transmission of the time coded altitude transmissions therefrom in a direction to represent a higher than actual altitude condition.

3. In the cooperative collision avoidance system of claim 1 the further improvement of means responsive to energizing of the down warning indicator to shift the time of transmission of the time coded altitude transmissions therefrom in a direction to represent a lower than actual altitude condition.

4. In a cooperative collision avoidance system which operates on real time, one-way transmissions and wherein all cooperating aircraft are equipped with means for transmitting and receiving signals including means whereby each cooperating system is assigned distinctive repeating times for transmitting signals therefrom, each cooperating aircraft including accurate time keeping means and means for maintaining said time keeping means in time synchronism with the time keeping means at other cooperating aircraft, and means at each aircraft for determining from each of the signals it receives from another aircraft whether or not it is on a collision course with the said other aircraft based on established criteria as to range, range rate and being in a coaltitude condition with each other which is represented by the aircraft having less than a predetermined altitude separation, said transmitting means in each aircraft including means for transmitting information encoded to represent the altitude of the transmitting aircraft, the improvement comprising means for determining at each receiving aircraft whether the altitude is higher or lower than the altitude of each aircraft whose transmission it receives in their respective transmitting times including particularly those transmissions from aircraft that have been determined to represent collision threats to the receiving aircraft, said last named means including means at each receiving aircraft to produce a signal during each occurrence of each assignable transmitting time to represent its own present altitude and bi-stable means capable of being in one of two alternate conditions depending upon the first to occur in a transmitting time assigned to a threatening aircraft of an altitude transmission from said threatening aircraft or of the signal representing the present altitude of the receiving aircraft, said bi-stable means being operable to determine which of the threatened aircraft is flying at the higher and which is flying at the lower altitude, said bi-stable means producing a first output when the receiving aircraft in which it is located is the higher of the threatened aircraft and a second output when the receiving aircraft in which it is located is the lower of the threatened aircraft, a first command indicator in each receiving aircraft energizable by occurrences of the said first outputs threat to command the pilot at the said aircraft to climb, and a second indicator in each aircraft energizable by occurrences of said second outputs thereat to command the pilot to descend, means for modifying subsequent transmissions from a commanded aircraft to reflect an altitude shifted in the direction of the commanded maneuver and means in the said other threatened aircraft responsive to receipt of the modified transmission to produce a reciprocal maneuver command.

5. In the cooperative collision avoidance system of claim 4 the first indicator in the higher flying aircraft will be energized to command the pilot thereat to climb while the second indicator in the lower flying aircraft will substantially simultaneously be energized to command the pilot thereat to descend in altitude.

6. In the cooperative collision avoidance system of claim 4 wherein three aircraft are flying on courses that are determined to represent collision threats to each other, the further improvement of means for determining in one of said aircraft that it is flying at the highest altitude of the three aircraft, means for determining in a second one of said aircraft that it is flying at the lowest altitude, said means for determining that said one aircraft is flying at the highest altitude producing an output to energize the first command indicator thereat, the means for determining that said second aircraft is flying at the lowest altitude producing an output to energize the second command indicator thereat, the third aircraft including means for producing a second output thereat with respect to the highest flying aircraft and a first output thereat with respect to the lowest flying aircraft, said first and second outputs produced at said third aircraft simultaneously energizing the first and second command indicators thereat.

7. In the cooperative collision avoidance system of claim 4 wherein the bi-stable means in each aircraft for determining which aircraft is flying higher and which is flying lower include a flip-flop circuit.

8. In the cooperative collision avoidance system of claim 4 including means responsive to the energizing of the first command indicator only to modify the transmitting means in the associated aircraft so that the aircraft will transmit altitude signal encoded to represent an altitude that is higher by some predetermined altitude than the actual altitude of the said aircraft.

9. In the cooperative collision avoidance system of claim 4 including means responsive to the energizing of the second command indicator only to modify the transmitting means in the associated aircraft so that the aircraft will transmit altitude signals encoded to represent an altitude that is lower by some predetermined altitude than the actual altitude of the said aircraft.

10. In the cooperative collision avoidance system of claim 6 wherein said means in said one aircraft for energizing the first command indicator thereat include means to modify the transmitting means at said one aircraft so that the transmitting means will transmit altitude signals encoded to represent a higher than actual altitude condition therefrom, and wherein said means in said second aircraft for energizing the second command indicator thereat include means to modify the transmitting means at said second aircraft so that the transmitting means will transmit altitude signals encoded to represent a lower than actual altitude condition therefrom, the simultaneous energizing of the first and second command indicators in said third aircraft having no effect on the encoded altitude signals being transmitted therefrom.

11. In the cooperative collision avoidance system of claim 10 wherein said means to modify the transmitting means to transmit signals representing higher than actual, lower than actual, and actual altitude in each aircraft include a flip-flop circuit for use in determining between any two aircraft representing threats to each other which is flying higher and which lower, said flip-flop circuit having inputs connected to respond to altitude signals encoded to represent its own altitude and to represent the altitude of other cooperating aircraft transmitting altitude encoded signals, said flip-flop circuit having output connections, and gate circuit means having inputs connected to receive the outputs of the flip-flop circuit and outputs which operate to control the transmitting means thereat to cause transmissions of altitude signals encoded to represent higher than actual, lower than actual or actual altitudes.

* * * * *